(12) United States Patent
Park et al.

(10) Patent No.: US 8,065,920 B2
(45) Date of Patent: Nov. 29, 2011

(54) GRIPPER AND DRIVING METHOD USING THE SAME

(75) Inventors: Kwang Bum Park, Gyeonggi-do (KR); Joon Shik Park, Gyeonggi-do (KR); Hyo Derk Park, Gyeonggi-do (KR)

(73) Assignee: Korea Electronics Technology Institute, Gyeonggi-Do (KR)

( * ) Notice: Subject to any disclaimer, the term of this patent is extended or adjusted under 35 U.S.C. 154(b) by 403 days.

(21) Appl. No.: 12/364,460

(22) Filed: Feb. 2, 2009

(65) Prior Publication Data
US 2009/0199651 A1 Aug. 13, 2009

(30) Foreign Application Priority Data

Feb. 11, 2008 (KR) .................. 10-2008-0012348

(51) Int. Cl.
*G01N 3/02* (2006.01)
(52) U.S. Cl. ........................................................ 73/860
(58) Field of Classification Search ...................... 73/860
See application file for complete search history.

(56) References Cited

U.S. PATENT DOCUMENTS

| | | | | |
|---|---|---|---|---|
| 5,224,386 A | * | 7/1993 | Curtis | 73/833 |
| 5,651,574 A | * | 7/1997 | Tanikawa et al. | 294/86.4 |
| 7,461,882 B2 | * | 12/2008 | Choi et al. | 294/100 |
| 2004/0103740 A1 | * | 6/2004 | Townsend et al. | 74/490.01 |
| 2009/0025502 A1 | * | 1/2009 | Nakamoto | 74/490.01 |

FOREIGN PATENT DOCUMENTS

JP 2009028859 * 1/2009

* cited by examiner

*Primary Examiner* — Lisa Caputo
*Assistant Examiner* — Octavia Davis
(74) *Attorney, Agent, or Firm* — Lee, Hong, Degerman, Kang & Waimey

(57) ABSTRACT

A gripper and a driving method using the same are disclosed, wherein an actuator has a configuration combined with a piezoelectric operating unit and a bending structure, whereby an amount of variation of a gap between fingers are amplified more than that of the piezoelectric operating unit by generating a movement of the fingers perpendicular to a movement direction of the piezoelectric operating unit, and wherein the gripper having arms including a strain gauge sensor can precisely measure a force applied to a micro object.

10 Claims, 6 Drawing Sheets

[Fig. 1]
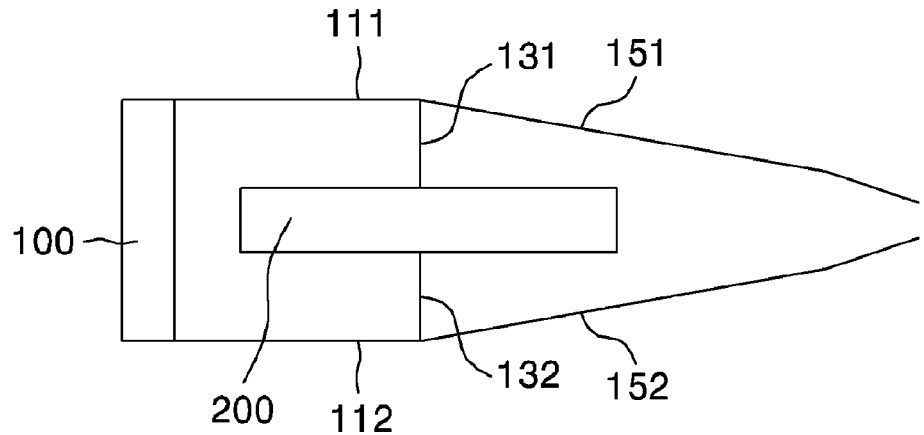
[Fig. 2]
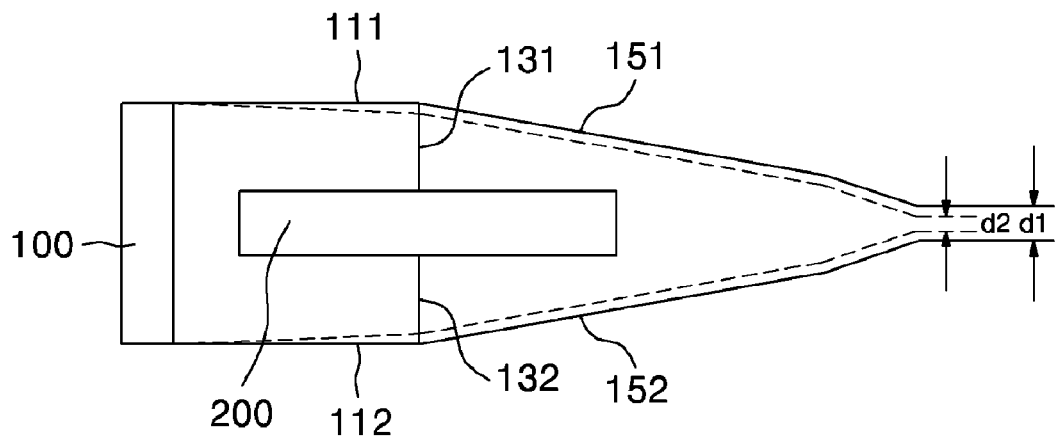
[Fig. 3]
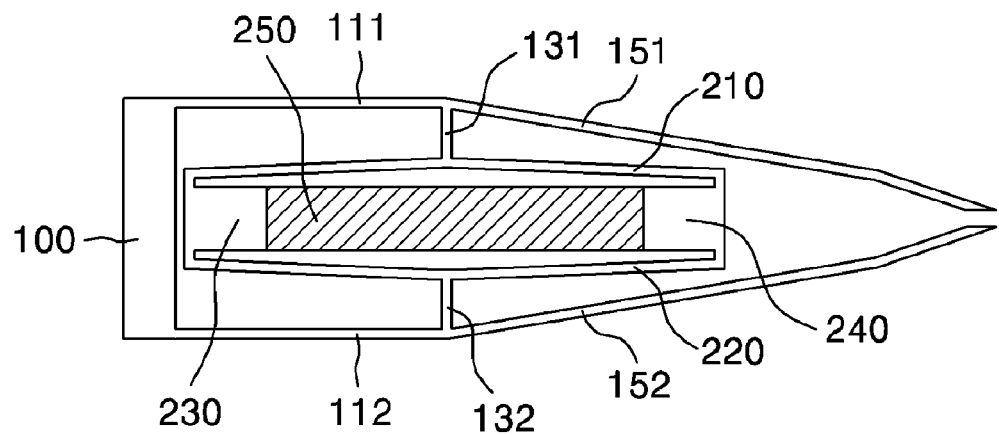

[Fig. 4a]
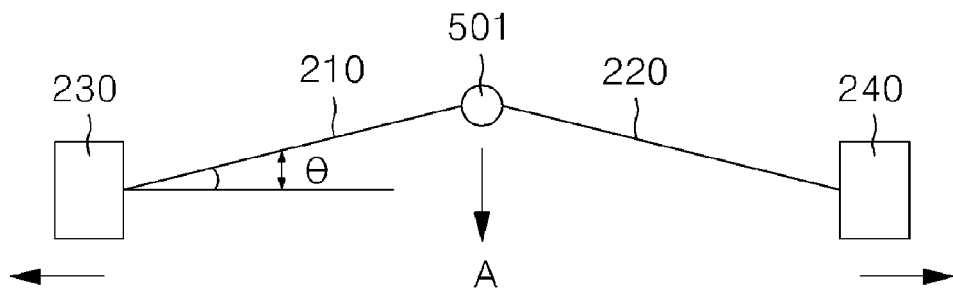
[Fig. 4b]
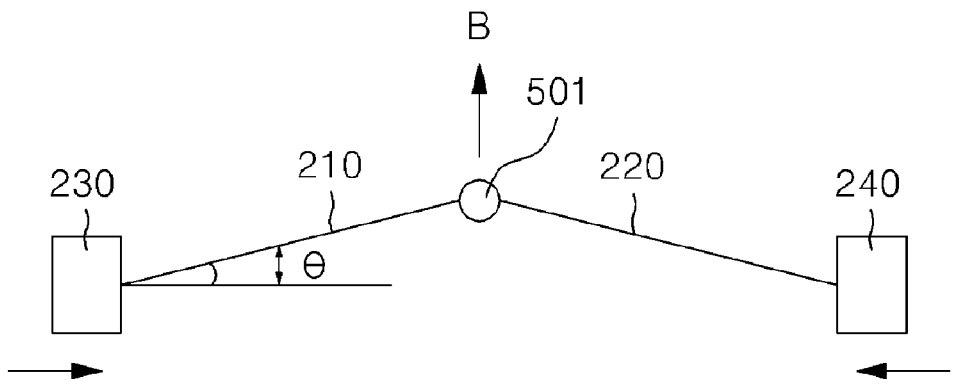
[Fig. 5]
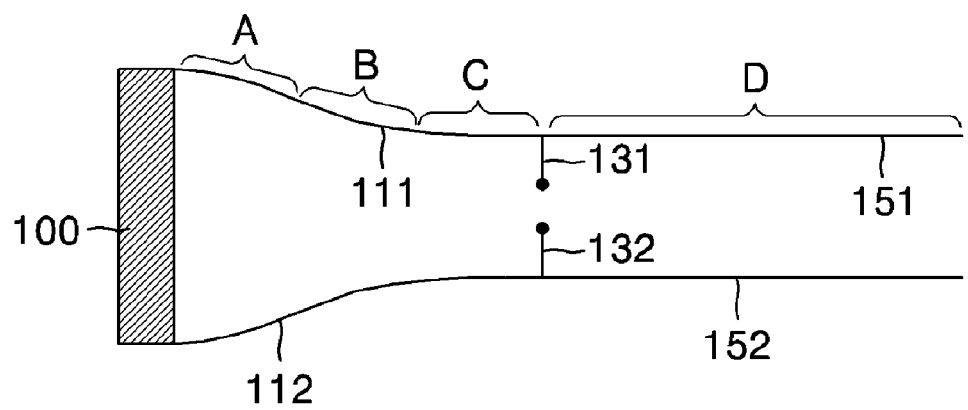

[Fig. 6]
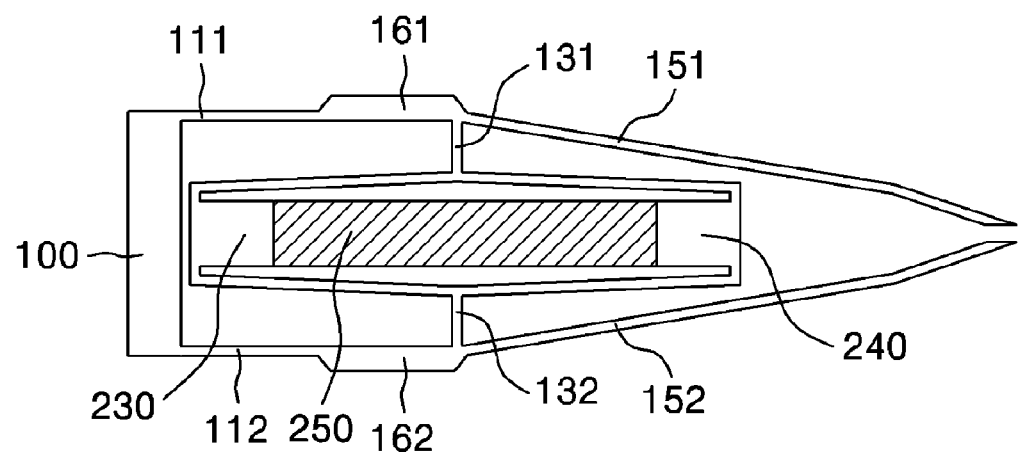
[Fig. 7]
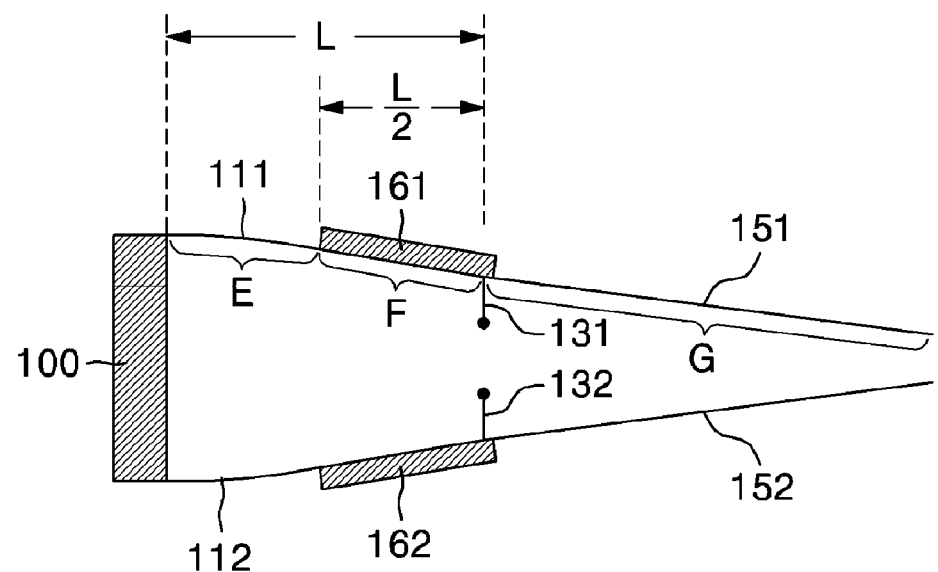

[Fig. 8]
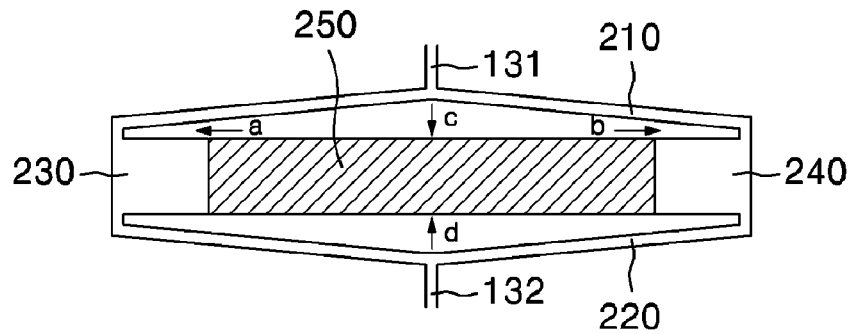
[Fig. 9]
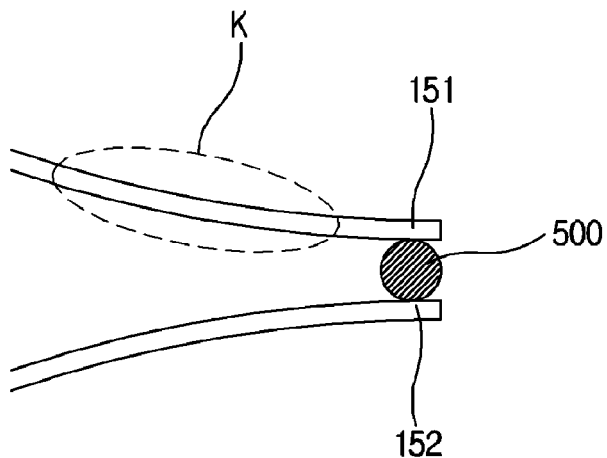
[Fig. 10]
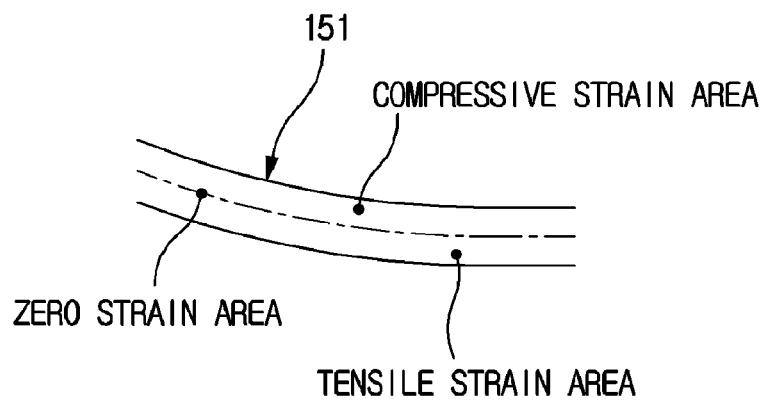

[Fig. 11]
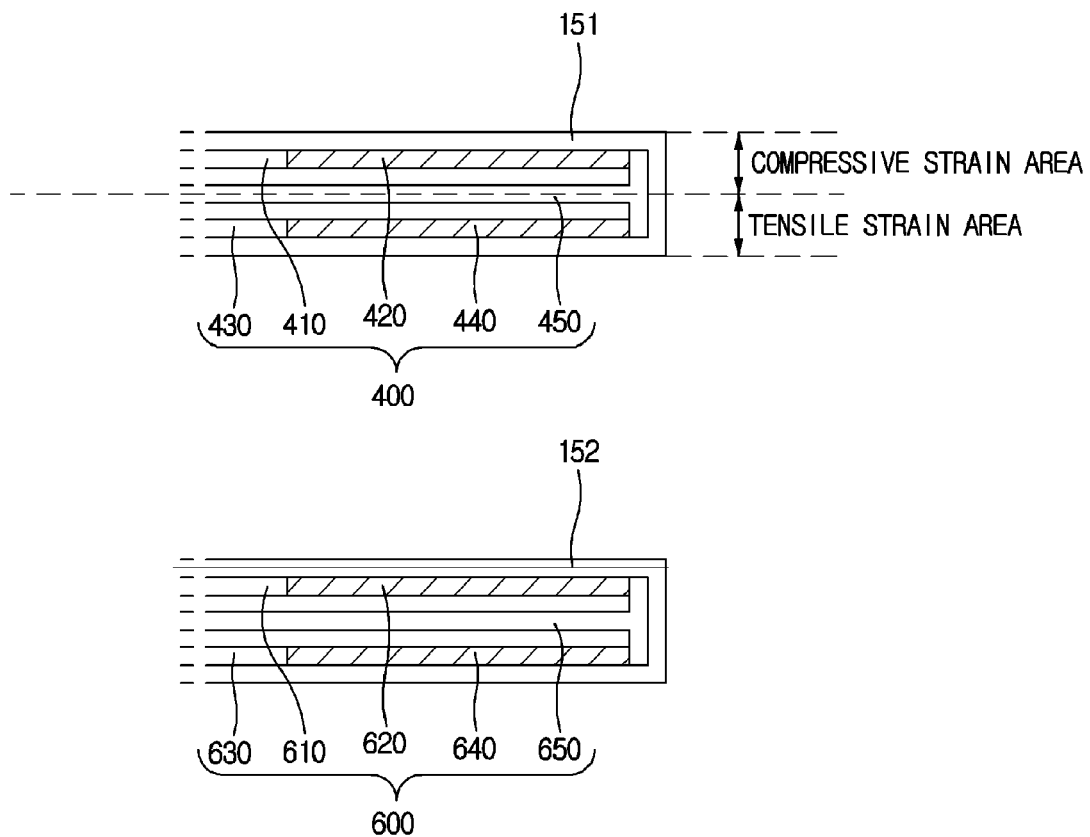
[Fig. 12]
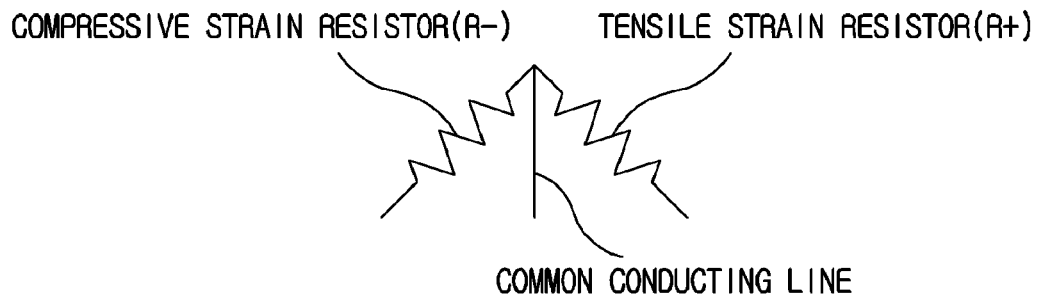

[Fig. 13]
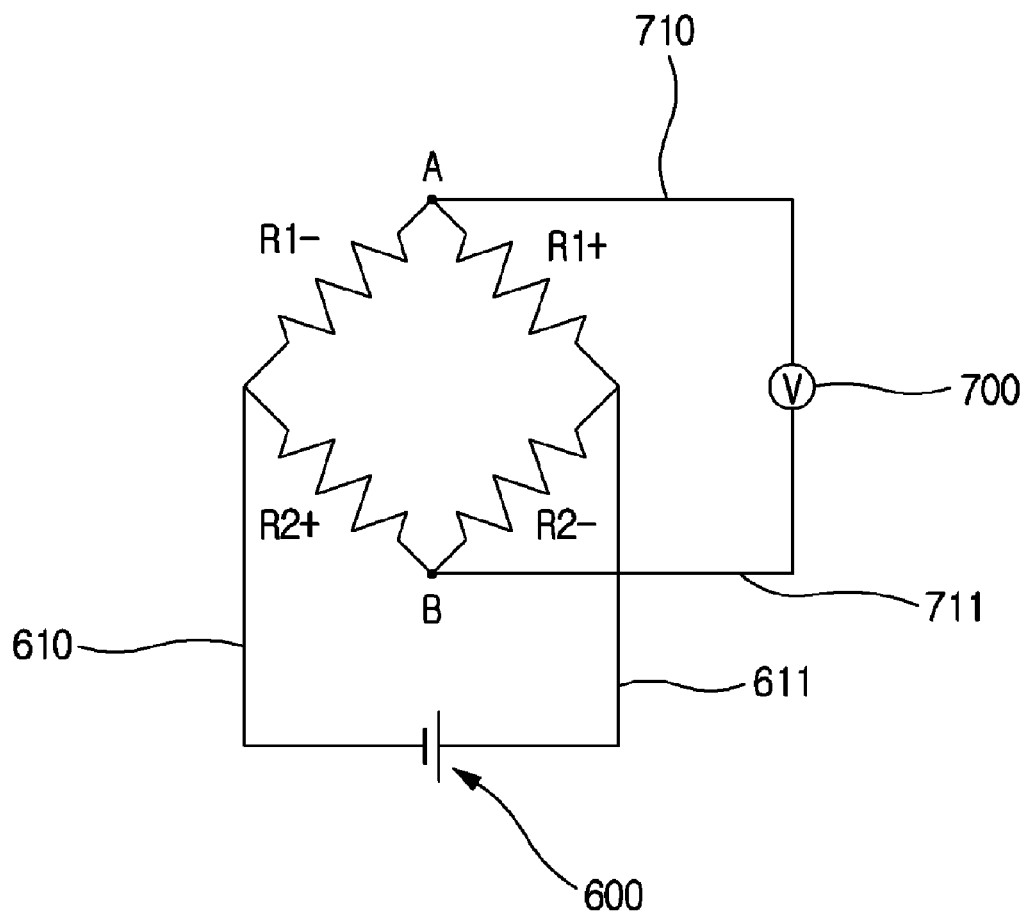

GRIPPER AND DRIVING METHOD USING THE SAME

CROSS-REFERENCE TO RELATED APPLICATIONS

The present invention claims priority of Korean patent application number 10-2008-0012348, filed on Feb. 11, 2008, which are incorporated by reference in its entirety.

BACKGROUND OF THE INVENTION

1. Field of the Invention

The present invention relates to a gripper capable of gripping micro objects of various sizes and a driving method using the same.

2. Description of the Related Art

According as electronic products trend to be miniaturized and light-weighted in recent years, semiconductor technologies come to be used in the development of micro structures, micro sensors, or actuators. Besides, increased interests on human body have led new researches into manipulating bio-cells. However, the fact is that there is no equipment capable of safely moving, fixing, or combining micro structures or micro substances such as bio-cells.

It should be therefore essential that researches for a micro gripper capable of moving a target with an exact preciseness be made to safely move, fix, or combine micro electronic products such as micro structures and actuators, or micro substances such as bio-cells.

Conventionally, there are two types of micro grippers: one uses electrostatic force and the other uses thermal expansion. In order to move arms, the gripper is formed with electrodes capable of generating electrostatic force directly on a target object, and in order to increase a driving force of the gripper for better operation, a high voltage is applied between the electrodes.

However, the gripper using the electrostatic force suffers from disadvantages in that difficulties in manufacturing processes may increase to push up the manufacturing cost as a result of obtainment of sufficient driving force generated by a narrow gap between the electrodes and supply of high voltage between the electrodes, and manipulation using the high voltage may damage living objects such as cells and microorganisms.

The gripper using the thermal expansion also suffers from disadvantages in that a sufficient time may be required for an increased temperature for generating hundreds of joules, leading to slowed operating speed, and micro structures such as cells and microorganisms susceptible to heat may be damaged due to a high heat transferred to the gripper.

SUMMARY OF THE INVENTION

According to some exemplary implementations, there is provided a gripper capable of grasping objects by narrowing a gap between fingers through an operation of an actuator.

According to some exemplary implementations, there is provided a gripper and a driving method using the same capable of amplifying a displacement of a finger over that of a piezoelectric operating unit by generating the displacement of the finger in a direction perpendicular to a displacement direction of the piezoelectric operating unit and by constituting an activator in a combined structure in which the piezoelectric operating unit and a bending structure are combined.

According to some exemplary implementations, there is provided a gripper capable of forming a supporting unit on arms whereby arms and fingers of the gripper can be deformed with slopes, and a gap between the fingers can be narrowed to increase the deformed sizes of the fingers, thereby allowing the gripper to grasp micro miniscule objects of various sizes.

According to some exemplary implementations, there is provided a gripper capable of accurately measuring a force applied to micro structures by forming a strain gauge sensor on the fingers.

In one general aspect of the present disclosure, there is provided a gripper, comprising: a supporting unit; a first arm and a second arm respectively connected to one side and the other side of the supporting unit; a first link connected to the first arm and the first finger; a second link connected to the second arm and the second finger; and an actuator arranged between the first link and the second link to pull the first and second links in response to an operating voltage.

In another general aspect of the present disclosure, there is provided a driving method using a gripper comprising: preparing a gripper composed of a first link and a second link respectively connected to a first finger and a second finger, a first bending structure and a second bending structure respectively connected to the first link and the second link, a first contact unit connected to one side of the first bending structure and to one side of the second bending structure, a second contact unit connected to the other side of the first bending structure and the other side of the second bending structure, and a piezoelectric operating unit expanded to the first contact unit and the second contact unit in response to an operating voltage by being connected to the first contact unit and the second contact unit; generating a displacement on the first contact unit and the second contact unit by applying a voltage to the piezoelectric operating unit and expanding the piezoelectric operating unit to the first contact unit and the second contact unit; shrinking the first bending structure to a direction of the piezoelectric operating unit using the displacement generated by the first contact unit and shrinking the second bending structure to a direction of the piezoelectric operating unit using the displacement generated by the second contact unit; pulling the first link and the second link connected to the first bending structure and the second bending structure to the direction of the piezoelectric operating unit in response to the shrinkage of the first bending structure and the second bending structure; and narrowing a gap between a first finger and a second finger respectively connected to the first link and the second link to grip an object.

BRIEF DESCRIPTION OF THE DRAWINGS

FIG. 1 is a plan view of a gripper according to an inventive principle of the present disclosure.

FIG. 2 is a schematic view illustrating a general operating principle of the gripper in FIG. 1.

FIG. 3 a plan view illustrating a first exemplary implementation of the present disclosure.

FIG. 4a and FIG. 4b are basic conceptual views illustrating operation of a gripper according to the present disclosure.

FIG. 5 is a conceptual view illustrating operation of a gripper according to a first exemplary implementation of the present disclosure.

FIG. 6 is a plan view illustrating a second exemplary implementation of the present disclosure.

FIG. 7 is a conceptual view illustrating operation of a gripper according to a second exemplary implementation of the present disclosure.

FIG. 8 is a conceptual view illustrating operation of an actuator according to the first and second exemplary implementations of the present disclosure.

FIG. 9 is a conceptual view illustrating a status in which a strain gauge sensor is formed at a gripper according to the present disclosure.

FIG. 10 is a schematic view illustrating a strain generated on 'K' of FIG. 9.

FIG. 11 is a schematic view illustrating a status in which a strain gauge sensor is formed on a gripper according to the present disclosure.

FIG. 12 is a partial circuit diagram illustrating resistors of a strain gauge sensor according to the present disclosure.

FIG. 13 is a full wheatstone bridge circuit diagram configured with a strain gauge sensor of a gripper according to the present disclosure.

DETAILED DESCRIPTION

Exemplary implementations of the present disclosure will be described in detail with reference to the accompanying drawings.

FIG. 1 is a plan view of a gripper according to an inventive principle of the present disclosure.

The gripper includes a supporting unit 100, a first arm 111 and a second arm 112 connected to one side and the other side of the supporting unit 100, respectively, a first finger 151 connected to the first arm 111, a second finger 152 coupled to the second arm 112, a first link 131 coupled to the first arm 111 and the first finger 151, a second link 132 connected to the second arm 112 and the second finger 152 and an actuator 200 arranged between the first link 131 and the second link 132. The actuator 200 pulls the first and second links in response to a given voltage.

The first arm 111 and the second arm 112 are spaced at a predetermined distance apart. The first finger 151 and the second finger 152 respectively connected to the first arm 111 and the second arm 112 are also spaced at a predetermined distance apart. In a case an operating voltage is applied to the actuator 200, the actuator 200 pulls the first and second links 131 and 132. Then, the gap between the first finger 151 and the second finger 152 become narrowed and a target object may be grasped.

The gripper manufactured in a very small size or a microscopic size may make it possible to grasp micro objects such as cells and the like in the range of several micrometers to several hundred micrometers.

FIG. 2 is a schematic view illustrating a general operating principle of the gripper in FIG. 1.

In a case an operating voltage is supplied to the actuator 200, the actuator is shrunken to pull the first and second links 131 and 132, whereby a gap between the first finger 151 and the second finger 152 comes to be narrowed. At this time, a gap 'd1' between the first finger 151 and the second finger 152 created before the operating voltage is given to the actuator 200 comes to be narrower than a gap 'd2' between the first finger 151 and the second finger 152 created after the operating voltage is given to the actuator 200, allowing the gripper to grasp a target object.

In a case the operating voltage ceases to be supplied, a pulling force of the first and second links 131 and 132 is removed to allow the first and second links 131 and 132 to return to their original position, whereby the gripped target object becomes free. That is, the narrowed gap of fingers would enable the gripper to grasp the target object according to the operation of the actuator 200. FIG. 3 a plan view illustrating a first exemplary implementation of the present disclosure.

In the first exemplary implementations, the actuator 200 in FIG. 1 is driven by a piezoelectric element. Referring to FIG. 1, the actuator 200 includes a first bending structure 210 connected to the first link 131, a second bending structure 220 connected to the second link 132, a first contact unit 230 commonly connected to one side of the first bending structure 210 and the second bending structure 220, a second contact unit 240 commonly connected to the other side of the first bending structure 210 and the second bending structure 220, and a piezoelectric operating unit 250 commonly connected to the first contact unit 230 and the second contact unit 240 wherein the piezoelectric operating unit 250 is expanded into the first and second contact units 230 and 240 depending on an operating voltage. As noted herein, the piezoelectric operating unit 250 is a piezoelectric element that drives the actuator.

In a case the piezoelectric operating unit 250 is applied with an operating voltage, the piezoelectric operating unit 250 is expanded into the first and second contact units 230 and 240, whereby displacement of the first and second contact units 230 and 240 is generated. The displacement generated from the first and second contact units 230 and 240 causes the first and second bending structures 210 and 220 to be shrunk toward the piezoelectric operating unit 250, and the first and second links 131 and 132 connected to the first and second bending structure 210, 220 are pulled toward the piezoelectric operating unit 250. The pulling force of the first and second link 131 and 132 toward the piezoelectric operating unit 250 causes the gap between the first and second fingers 151 and 152 to be narrower, thereby enabling the target object to be grasped.

Now, referring to FIG. 4a, in a case the piezoelectric operating unit 250 is applied with an operating voltage, the piezoelectric operating unit 250 is expanded to push the first and second contact units 230 and 240, whereby the bending structures 210 and 220 are moved downward and the first connection unit 501 connected to the first link 131 is moved toward 'A' direction to pull the first link 131.

Referring to FIG. 4b, in a case the supply of the operating voltage is stopped at the piezoelectric operating unit 250, the piezoelectric operating unit 250 is shrunk to restore to an original shape. The contact units 230 and 240 connected to the piezoelectric operating unit 250 are pulled to move the bending structures 210 and 220 upward, and the first connection unit 501 connected to the first link 131 is moved toward 'B' direction and the first link 131 returns to its original position.

In FIGS. 4a and 4b, the size of movement displacement of the first connection unit 501 connected to the first link 131 depends on an angle (θ) formed by the bending structures 210 and 220. In other words, the moving distance of the first connection unit 501 may be amplified according the angle (θ) formed by the bending structures 210 and 220. For example, if the first and second contact units 230 and 240 connected to the piezoelectric operating unit is horizontally expanded or shrunken by 10 μm, the first connection unit 501 may vertically move in the range of 50 μm to 100 μm.

Preferably, the supporting unit 100, the arms 111 and 112, the fingers 151 and 152, the links 131 and 132, the bending structures 210 and 220, and the contact units 230 and 240 is made of a material selected from a group consisting of Si, Ni, NiCr, and polymer. If the gripper is manufactured with the polymer, the gripper may be used for biochemical experiments.

FIG. 5 is a conceptual view illustrating operation of a gripper according to a first exemplary implementation of the present disclosure, where an increased displacement of the piezoelectric operating unit 250 in response to an external voltage may pull the links 131 and 132. The one side of the arms 111 and 112 is fixed at the supporting unit 100 and the other side of the arms 111 and 112 is connected to the links 131 and 132, such that the arms 111 and 112 connected to the links 131 and 132 are affected by displacement accordingly. That is, 'ABC' sections of the first arm 111 are deformed in the shape of, e.g., an 'S', as shown in FIG. 5. At this time, the section of 'C' of the first arm 111 experiences a gentle deformation, which is intactly transmitted to the first finger 151. The displacement of the first finger 151 results in the movement of the first link 131. As noted above, the gap between the fingers 151 and 152 becomes narrowed to enable the gripper to grasp a target object.

FIG. 6 is a plan view illustrating a gripper according to a second exemplary implementation of the disclosure, where the first and second arm 111 and 112 are formed with support units 161 and 162. The support units 161 and 162 formed at the first and second arm 111 and 112 prevent the first and second arm 111 and 112 from being deformed in the shape of an 'S', and serve to increase the movement displacement of the first and second arm 151 and 152.

FIG. 7 is a conceptual view illustrating operation of a gripper according to a second exemplary implementation of the present disclosure, where the gripper is formed with first and second support unit 161 and 162 at part of the first and second arm 111 and 112.

A displacement of the piezoelectric operating unit (not shown) increased by an external voltage may pull the first link 131, where the force pulling the first link 131 is offset by the support unit 161, and whereby the first arm 111 is prevented from being deformed in the shape of 'S' but is gently curved to allow E section and F section to be inclined as shown in FIG. 7. Thus, a 'G' section of the first finger 151 is deformed at the same inclination angle as that of an 'E' section and 'F' section.

In other words, a gap between the first arm and the second arm according to the second exemplary implementation comes to be narrower than that of a gap formed between the first arm and the second arm according to the first exemplary implementation, whereby the size of displacement of the gripper becomes larger. To be more specific, the arms formed with support units allow the arms and fingers to be deformed with a slope, whereby the gap between the arms are narrowed to increase the size of displacement and the gripper can grip target objects with more accuracy. Preferably, each side of the first and second support unit 161 and 162 is positioned at a half point of the length of the first and second arm 111 and 112, and the other side of each of the first and second support unit 161 and 162 is positioned at part of the first and second arm 151 and 152 past a point where the first and second arm 111 and 112 and the first and second link 131 and 132 meet.

FIG. 8 is a conceptual view illustrating operation of an actuator according to the first and second exemplary implementations of the present disclosure.

Referring to FIG. 8, the actuator includes a first bending structure 210 coupled to a first link 131, a second bending structure 220 coupled to a second link 132, a first contact unit 230 coupled to the one side of the bending structures 210 and 220, a second contact unit 240 coupled to the other side of the bending units 210 and 220, and a piezoelectric operating unit 250 arranged between the first contact unit 230 and the second unit 240. The piezoelectric operating unit 250 is expanded toward the first and second contact unit 230 and 240 in response to the operating voltage.

In a case that an operating voltage is applied to the piezoelectric operating unit 250, the piezoelectric operating unit 250 is expanded to push the first and second contact unit 230 and 240 toward 'a' direction and 'b' direction, respectively. Due to the contact units 230 and 240 being pushed, the bending structures 210 and 220 are pulled toward 'c' direction and 'd' direction, respectively. The links 131 and 132 connected to the bending structures 131 and 132 are pulled toward 'c' direction and 'd' direction, respectively. Thus, a gap between the fingers connected to the links 131 and 132 become narrower to make it possible for the gripper to grasp a target object.

As described above, the actuator is configured with the piezoelectric operating unit and the bending structures to generate a displacement of fingers in a direction perpendicular to the displacement direction of the piezoelectric operating unit, whereby an advantage may be obtained where the displacement of the fingers is more amplified than that of the piezoelectric operating unit. This means that the gripper can effectively grasp a target object with a minimum operating voltage.

Now, a driving method using a gripper according to the inventive principle of the disclosure will be described. The method comprises: preparing a gripper composed of a first link and a second link respectively connected to a first finger and a second finger, a first bending structure and a second bending structure respectively connected to the first link and the second link, a first contact unit connected to one side of the first bending structure and to one side of the second bending structure, a second contact unit connected to the other side of the first bending structure and the other side of the second bending structure, and a piezoelectric operating unit expanded to the first contact unit and the second contact unit in response to an operating voltage by being connected to the first contact unit and the second contact unit; generating a displacement on the first contact unit and the second contact unit by applying a voltage to the piezoelectric operating unit and expanding the piezoelectric operating unit to the first contact unit and the second contact unit; shrinking the first bending structure to a direction of the piezoelectric operating unit using the displacement generated by the first contact unit and shrinking the second bending structure to a direction of the piezoelectric operating unit using the displacement generated by the second contact unit; pulling the first link and the second link connected to the first bending structure and the second bending structure to the direction of the piezoelectric operating unit in response to the shrinkage of the first bending structure and the second bending structure; and narrowing a gap between a first finger and a second finger respectively connected to the first link and the second link to grip an object.

As shown in FIG. 9, if a grasping force of a target object 500 such as a micro object or a microorganism using the fingers 151 and 152 of the gripper is overly strong, the excessive strong force may damage the target object. The present disclosure is advantageous in that it is provided with a gripper with a measuring unit capable of measuring the force used in the gripper grasping the target object 500. The measuring unit may therefore protect the target object 500 against the damage caused by the excessive grasping force.

Referring to FIG. 11, a first strain gauge sensor 400 is arranged at the first finger 151 and a second strain gauge sensor 600 is arranged at the second finger 152. The strain gauge sensors 400 and 600 can measure a force of the gripper grasping a target object using tip ends of the fingers. The first strain gauge sensor 400 includes a first conducting line 410, a compressive strain resistor 420 coupled to the first conducting line 410, a second conducting line 430, a tensile strain resistor 440 coupled to the second conducting line 430, and a common conducting line 450 connecting the compressive strain resistor 420 with the tensile strain resistor 440. The second strain gauge sensor 600 is structured in the same configuration as that of the first strain gauge sensor 400.

In a case the first and second finger 151 and 152 of the gripper grasps a target micro object, the size of force applied to the micro object may be measured by measurement of changed resistance values of resistors in the strain gauge sensors 400 and 600. When the gripper grip the target object, a compressive strain and a tensile strain are generated at fingers 151 and 152, respectively. As depicted in FIG. 10, the first finger 151 may be divided into a compressive strain area generating the compressive strain and a tensile strain area generating the tensile strain based on a zero strain line as a central line. The compressive strain resistor 420 is formed in the compressive strain area and the tensile strain resistor 440 is formed in the tensile strain area. The common conducting line 450 is preferably formed between the compressive strain resistor 420 and the tensile strain resistor 440.

Furthermore, each of the strain gauge sensors formed at the first and second finger 151 and 152 is made to have the same resistance. Preferably, NiCr or poly-Si may be used for the compressive strain resistor 420 and the tensile strain resistor 440. The first and second conducting lines 410 and 430 and the common conducting line 450 may use Cu or Au, each having small resistance changes, in order to minimize resistance variations of the first and second conducting lines 410 and 410, and the common conducting line 450 in response to strain changes of the fingers 151 and 152. Preferably, the conducting lines 410, 430, and 450 should be formed thicker than the compressive strain resistor 420 and the tensile strain resistor 440. In other words, the conducting lines 410, 430, and 450, each having a smaller resistance value, may be applied with minimized resistance variations that may be caused by the strain changes of the fingers 151 and 152. The first and second conducting lines 410 and 430 and the common conducting line 450 are extended up to the supporting unit 100 in FIG. 1.

The resistance value of the compressive strain resistor 420 is decreased (−) by the compressive strain of the fingers 151 and 152, and the resistance of the tensile strain resistor 440 is increased (+) by the tensile strain of the fingers 151 and 152. The resistance values of the lines 410, 430 and 450 practically remain unchanged over those of the compressive strain 420 and the tensile strain resistor 440.

Therefore, the strain gauge sensor of FIG. 11 may be expressed by a circuit diagram in which a resistance value-decreasing resistor (R−) and a resistance value-increasing resistor (R+) are connected to a common conducting line 450, as shown in FIG. 12.

FIG. 13 is a full wheatstone bridge circuit diagram configured with a strain gauge sensor of a gripper according to the present disclosure, where a first compressive strain resistor R1− and a second compressive strain resistor R2−, respectively formed at the first and second finger 151 and 152, face each other, a first strain resistor R1+ and a second strain resistor R1+ face other, a first common line 610 and a second common line 611 are connected to an electric power source 600, where the first common line 610 is connected by the first compressive strain resistor R1− and a second tensile strain resistor R2+, the second common line 611 is connected by the second compressive strain resistor R2− and the first tensile strain resistor R1+, and a third common line 710 and a fourth common line 711 are connected to a voltage measuring unit 700, where the third common line 710 is connected by the first compressive strain resistor R1− and the first tensile strain resistor R1+, and the fourth common line 711 is connected by the second compressive strain resistor R2− and the second tensile strain resistor R2+.

That is, the full wheatstone bridge circuit is configured in such a manner that the first finger 151 is formed with the first compressive strain resistor R1− and the first tensile strain resistor R1+, the second finger 152 is formed with the second compressive strain resistor R2− and the second tensile strain resistor R2+, the first compressive strain resistor R1− and the second tensile strain resistor R2+ are connected to the first common line 610, the second compressive strain resistor R2− and the first tensile strain resistor R1+ are connected to the second common line 611, the first common line 610 and the second common line 611 are connected to the electric power source 600, the first compressive strain resistor R1− and the first tensile strain resistor R1+ are connected to the third common line 710, the second compressive strain resistor R2− and the second tensile strain resistor R2+ are connected to the fourth common line 711, and the third and fourth common line 700 and 711 are connected to the voltage measuring unit 700.

Therefore, a strain value generated by the fingers 151 and 152 may be detected by measuring a potential difference between a node 'A' and a node 'B' of the full wheatstone bridge circuit to calculate the force applied to a micro object.

As apparent from the foregoing, the gripper according to the present invention is capable of gripping an micro object by narrowing a gap between fingers through operation of an actuator. Because the actuator has a configuration combining a piezoelectric operating unit and a bending unit and movement of the fingers perpendicular to a movement direction of the piezoelectric operating unit is generated, an amount of variation of the gap between the fingers may be amplified more than the movement of the piezoelectric operating unit. Also, due to the supporting unit, arms and fingers of the gripper can be moved with a slope, and the gap between the fingers can be efficiently narrowed to increase the movement of the fingers. Therefore, the gripper having the supporting unit can accurately and safely grasp micro objects of various sizes in comparison to the conventional gripper.

While the present disclosure has been described with respect to the specific exemplary implementations, it will be apparent to those skilled in the art that various changes and modifications may be made without departing from the spirit and scope of the disclosure as defined in the following claims.

What is claimed is:

1. A gripper, comprising:
a supporting unit;
a first arm and a second arm respectively connected to one side and the other side of the supporting unit;
a first link connected to the first arm and a first finger;
a second link connected to the second arm and a second finger;
an actuator arranged between the first link and the second link to pull the first and second links in response to an operating voltage;
a first strain gauge sensor arranged at the first finger; and
a second strain gauge sensor is arranged at the second finger,
wherein each of the first strain gauge sensor and the second strain gauge sensor comprises:
a first conducting line;
a compressive strain resistor coupled to the first conducting line;
a second conducting line;

a tensile strain resistor coupled to the second conducting line; and a common conducting line connecting the compressive strain resistor with the tensile strain resistor.

2. The gripper of claim 1, wherein part of the first arm and the second arm are formed with a first support unit and a second support unit.

3. The gripper of claim 2, wherein each distal end of the first support unit and the second support unit is formed at a half point of a length (L) of the first arm and the second arm, and each of the other distal end of the first support unit and the second support unit are positioned at part of the first finger and the second finger past the common point where the first link and the second link meet the first arm and the second arm.

4. The gripper of claim 2, wherein the actuator includes:
a first bending structure coupled to the first link;
a second bending structure coupled to the second link;
a first contact unit commonly coupled to one side of the first bending structure and the second bending structure;
a second contact unit commonly coupled to the other side of the first bending structure and the second bending structure; and
a piezoelectric operating unit commonly coupled to the first contact unit and the second contact unit, where the piezoelectric operating unit is expanded into the first and second contact units depending on the operating voltage.

5. The gripper of claim 4, wherein the supporting unit, the arm units, the fingers, the links, the bending structures, and the contact units are made of one of materials selected from a group consisting of Si, Ni, NiCr, and polymer.

6. The gripper of claim 1, wherein the first and second conducting lines and the common conducting line are extended up to the support unit.

7. The gripper of claim 1, wherein the compressive strain resistor and the tensile strain resistor are made of NiCr or Poly-Si.

8. The gripper of claim 1, wherein the common conducting line is arranged between the compressive strain resistor and the tensile strain resistor.

9. The gripper of claim 1, wherein the first and second conducting lines and the common conducting line are made of Cu or Au.

10. A driving method of a gripper, comprising:
preparing a gripper composed of a first link and a second link respectively connected to a first finger and a second finger, a first bending structure and a second bending structure respectively connected to the first link and the second link, a first contact unit connected to one side of the first bending structure and to one side of the second bending structure, a second contact unit connected to the other side of the first bending structure and the other side of the second bending structure, and a piezoelectric operating unit expanded to the first contact unit and the second contact unit in response to an operating voltage by being connected to the first contact unit and the second contact unit;
generating a displacement on the first contact unit and the second contact unit by applying a voltage to the piezoelectric operating unit and expanding the piezoelectric operating unit to the first contact unit and the second contact unit;
shrinking the first bending structure to a direction of the piezoelectric operating unit using the displacement generated by the first contact unit and shrinking the second bending structure to a direction of the piezoelectric operating unit using the displacement generated by the second contact unit;
pulling the first link and the second link connected to the first bending structure and the second bending structure to the direction of the piezoelectric operating unit in response to the shrinkage of the first bending structure and the second bending structure; and
narrowing a gap between a first finger and a second finger respectively connected to the first link and the second link to grip an object.

* * * * *